(12) United States Patent
Otsuki et al.

(10) Patent No.: US 11,643,795 B2
(45) Date of Patent: May 9, 2023

(54) WORK MACHINE INFORMATION PROCESSING DEVICE, INFORMATION MANAGEMENT SYSTEM, AND WORK MACHINE INFORMATION PROCESSING PROGRAM

(71) Applicant: SUMITOMO HEAVY INDUSTRIES, LTD., Tokyo (JP)

(72) Inventors: Shunsuke Otsuki, Yokosuka (JP); Susumu Aizawa, Yokosuka (JP); Yoshihisa Kiyota, Yokosuka (JP); Danting Li, Yokosuka (JP)

(73) Assignee: SUMITOMO HEAVY INDUSTRIES, LTD., Tokyo (JP)

(*) Notice: Subject to any disclaimer, the term of this patent is extended or adjusted under 35 U.S.C. 154(b) by 19 days.

(21) Appl. No.: 17/520,723

(22) Filed: Nov. 8, 2021

(65) Prior Publication Data
US 2022/0056673 A1    Feb. 24, 2022

Related U.S. Application Data

(63) Continuation of application No. PCT/JP2020/014029, filed on Mar. 27, 2020.

(51) Int. Cl.
*G08B 5/00*   (2006.01)
*E02F 9/26*   (2006.01)
(Continued)

(52) U.S. Cl.
CPC .......... *E02F 9/26* (2013.01); *B60Q 9/00* (2013.01); *E02F 9/24* (2013.01); *G06V 20/58* (2022.01); *G06V 20/597* (2022.01); *G08B 21/02* (2013.01)

(58) Field of Classification Search
USPC .............. 340/691.6, 685, 691.3, 686.5, 613, 340/539.24, 431, 825.23
See application file for complete search history.

(56) References Cited

U.S. PATENT DOCUMENTS

| 2015/0127212 A1* | 5/2015 | Chacon ............... G05D 1/0011 701/32.4 |
| 2017/0037725 A1* | 2/2017 | Uotila .................... E21B 7/025 |

(Continued)

FOREIGN PATENT DOCUMENTS

| JP | 2007-085091 A | 4/2007 |
| JP | 2009-235833 A | 10/2009 |
| JP | 2017-156972 A | 9/2017 |

OTHER PUBLICATIONS

International Search Report of PCT/JP2020/014029 (parent of the present application), dated Jun. 9, 2020.

*Primary Examiner* — Daniel Previl
(74) *Attorney, Agent, or Firm* — WTA Patents

(57) ABSTRACT

There is provided a work machine information processing device including a risk detector configured to detect a risk relating to a state or a surrounding environment of a work machine, notifier configured to notify an operator of the work machine of the risk detected by the risk detector, behavior detector configured to detect a behavior of the operator after the notification of the notifier, and calculator configured to calculate a safety behavior evaluation value obtained by quantitatively evaluating the behavior of the operator in terms of a degree of contribution to the safety, based on contents of the risk detected by the risk detector and the behavior of the operator detected by the behavior detector.

9 Claims, 6 Drawing Sheets

(51) Int. Cl.
   *G06V 20/58* (2022.01)
   *G06V 20/59* (2022.01)
   *B60Q 9/00* (2006.01)
   *E02F 9/24* (2006.01)
   *G08B 21/02* (2006.01)

(56) References Cited

U.S. PATENT DOCUMENTS

2018/0087240 A1* 3/2018 Schmitt .................... E02F 9/26
2018/0341901 A1* 11/2018 Shike .................... G06Q 50/08

* cited by examiner ical Field
WORK MACHINE INFORMATION PROCESSING DEVICE, INFORMATION MANAGEMENT SYSTEM, AND WORK MACHINE INFORMATION PROCESSING PROGRAM

CROSS-REFERENCE TO RELATED APPLICATIONS

This application is a bypass continuation application of International PCT Application No. PCT/JP2020/014029, filed on Mar. 27, 2020, which is incorporated by reference herein in its entirety.

BACKGROUND

Technical Field

Certain embodiments of the present invention relate to a work machine information processing device, an information management system, and a work machine information processing program.

Description of Related Art

In the related art, for example, in a work machine such as an excavator, a technique is known in which a risk such as an entry of a person to a periphery of the work machine is detected to warn an operator of occurrence of the risk (for example, refer to the related art).

However, there exists no technique for improving safety of a work site by evaluating a behavior of an operator who recognized the risk.

SUMMARY

According to an aspect of the present invention, there is provided a work machine information processing device including a risk detector configured to detect a risk relating to a state or a surrounding environment of a work machine, notifier configured to notify an operator of the work machine of the risk detected by the risk detector, behavior detector configured to detect a behavior of the operator after the notification of the notifier, and calculator configured to calculate a safety behavior evaluation value obtained by quantitatively evaluating the behavior of the operator in terms of a degree of contribution to the safety, based on contents of the risk detected by the risk detector and the behavior of the operator detected by the behavior detector.

According to another aspect of the present invention, there is provided an information management system including a plurality of work machines on which the work machine information processing device in the above-described aspect is mounted, and an information management device configured to transmit and receive information to and from the plurality of work machines. The information management device includes storage unit for accumulating the safety behavior evaluation value received from the plurality of work machines.

According to still another aspect of the present invention, there is provided a computer readable medium storing a work machine information processing program that causes a computer of a work machine information processing device including risk detector to execute a process for detecting a risk relating to a state or a surrounding environment of a work machine. The process includes notifying an operator of the work machine of the risk detected by the risk detector, detecting a behavior of the operator after the notification of the notifier, and calculating a safety behavior evaluation value obtained by quantitatively evaluating the behavior of the operator in terms of a degree of contribution to the safety, based on contents of the risk detected by the risk detector and the behavior of the operator detected by the behavior detector.

DETAILED DESCRIPTION

It is desirable to improve safety of a work site.

According to embodiments of the present invention, the safety of the work site can be improved.

Hereinafter, an embodiment according to the present invention will be described in detail with reference to the drawings.

Configuration of Excavator

First, a configuration of an excavator 100 according to the present embodiment will be described. The excavator 100 is an example of a work machine according to the embodiment of the present invention, and is configured to include a work machine information processing device according to the embodiment of the present invention. In this manner, a behavior of an operator when a risk occurs can be evaluated.

Figure 1:
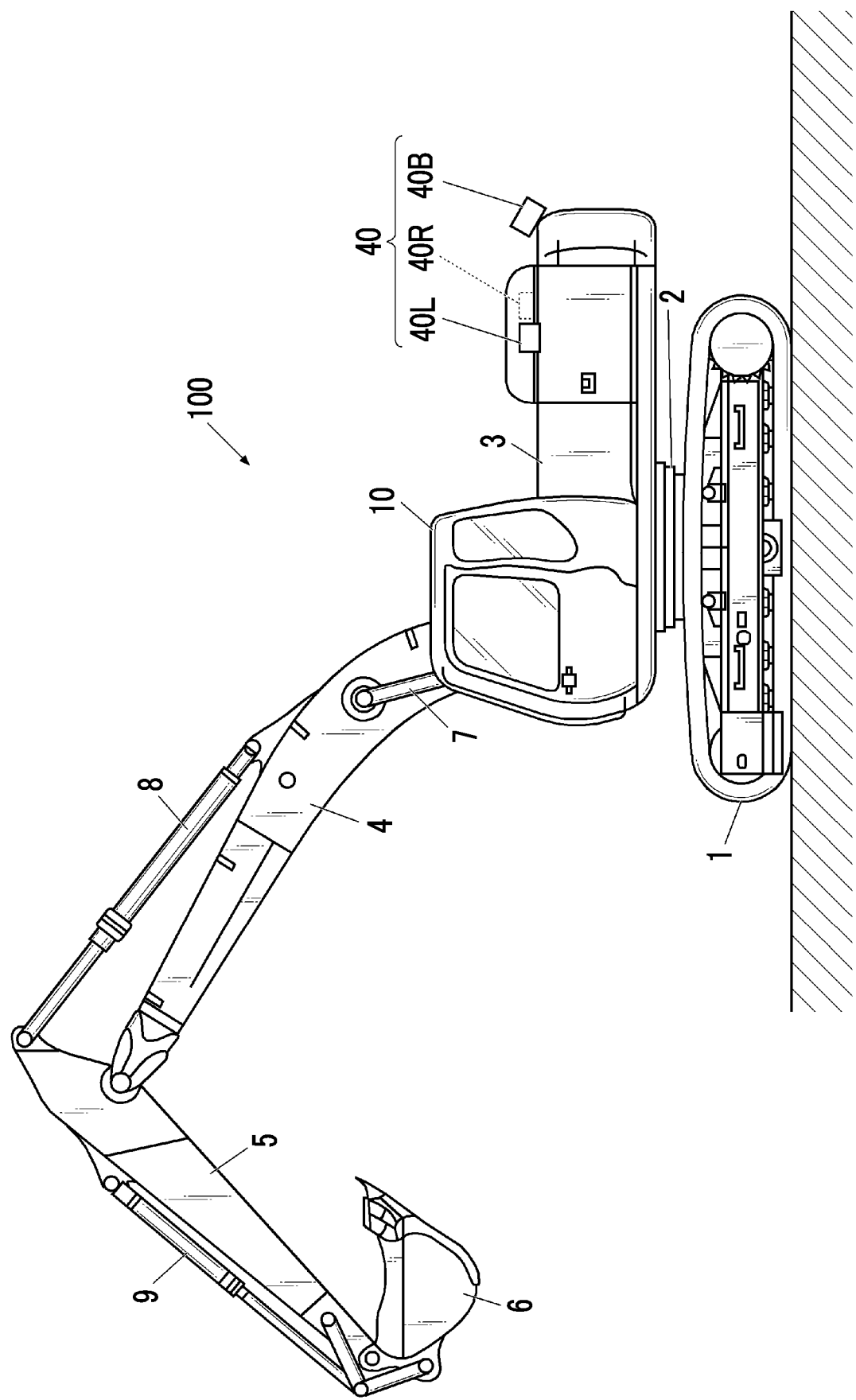
FIG. 1 is a side view of an excavator to an embodiment of the present invention.

FIG. 1 is a side view of the excavator 100 according to the present embodiment.

As illustrated in the drawing, the excavator 100 includes a lower traveling body 1, a rotating platform 3 mounted on the lower traveling body 1 to be capable of turning via a turning mechanism 2, a boom 4, an arm 5, and a bucket 6 which serve as attachments, and a cabin 10 on which the operator rides. The attachments are not limited thereto as long as a work element (for example, the bucket, a crusher, or a crane apparatus) is provided.

For example, the lower traveling body 1 include a pair of right and left crawlers. Each of the crawlers is hydraulically driven by a traveling hydraulic motor (not illustrated) so that the excavator 100 travels.

The rotating platform 3 is driven by a turning hydraulic motor or an electric motor (both are not illustrated) to turn with respect to the lower traveling body 1.

The boom 4 is pivotally attached to a front center of the rotating platform 3 to be capable of derricking, the arm 5 is pivotally attached to a tip of the boom 4 to be vertically pivotable, and the bucket 6 is pivotally attached to a tip of the arm 5 to be vertically pivotable. The boom 4, the arm 5, and the bucket 6 are respectively and hydraulically driven by a boom cylinder 7, an arm cylinder 8, and a bucket cylinder 9. The cabin 10 is a cockpit on which an operator rides, and is mounted on a front left side of the rotating platform 3, for example.

Figure 2:
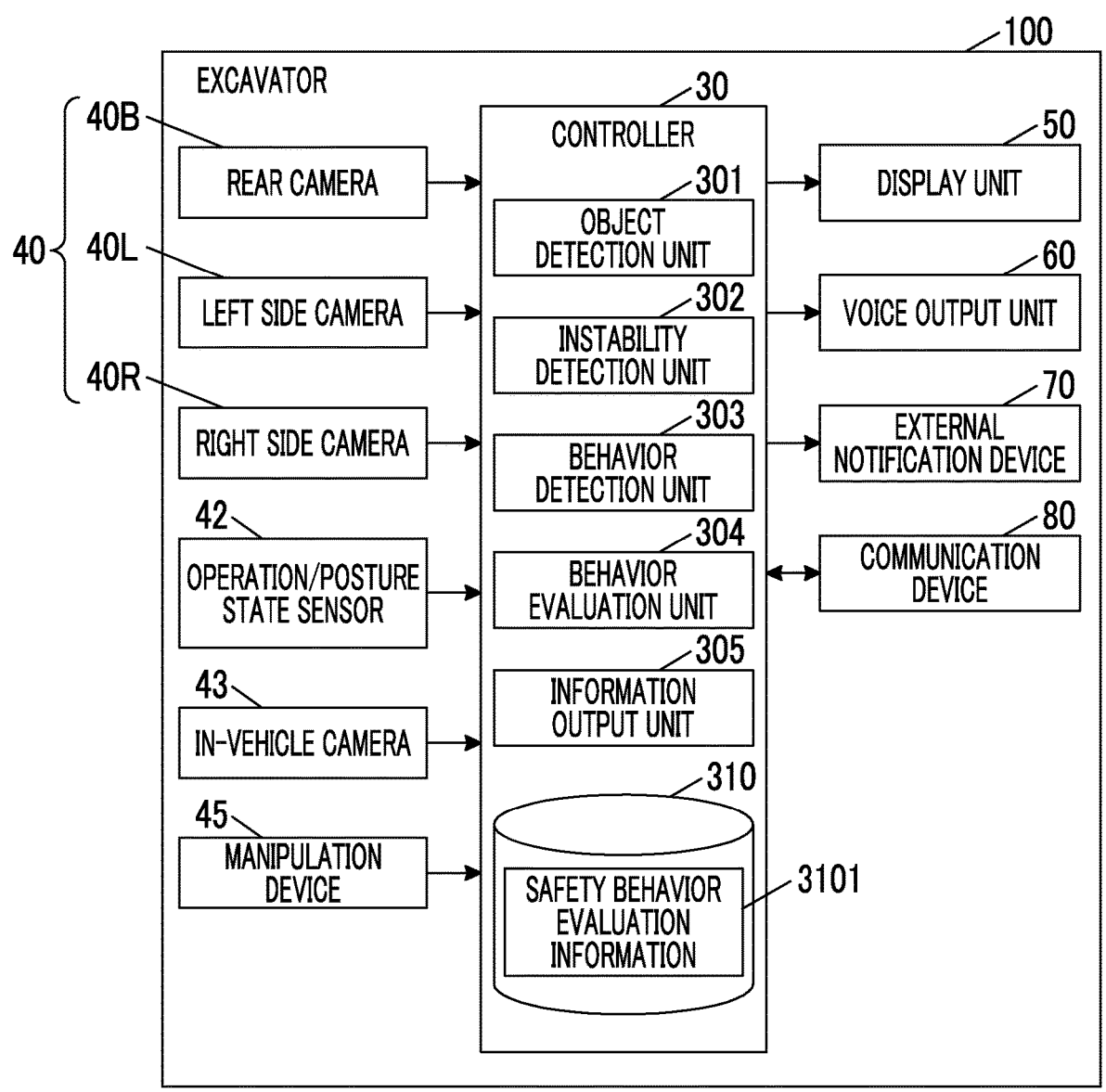
FIG. 2 is a block diagram illustrating a system configuration of the excavator in FIG. 1.

FIG. 2 is a block diagram illustrating a system configuration of the excavator 100.

As illustrated in the drawing, in addition to the above-described configuration, the excavator 100 includes a controller 30, an imaging device 40, an operation/posture state sensor 42, an in-vehicle camera 43, a manipulation device 45, a display unit 50, a voice output unit 60, an external notification device 70, and a communication device 80. The work machine information processing device according to the embodiment of the present invention is configured to include the controller 30, the imaging device 40, the operation/posture state sensor 42, the in-vehicle camera 43, the manipulation device 45, the display unit 50, and the voice output unit 60.

The imaging device 40 is attached to an upper portion of the rotating platform 3, images a periphery of the excavator 100, and outputs an image thereof to the controller 30. The imaging device 40 includes a rear camera 40B, a left side camera 40L, and a right side camera 40R.

The rear camera 40B is attached to a rear end upper portion of the rotating platform 3, and images a rear side of the rotating platform 3.

The left side camera 40L is attached to a left upper end portion of the rotating platform 3, and images a left side of the rotating platform 3.

The right side camera 40R is attached to a right end upper portion of the rotating platform 3, and images a right side of the rotating platform 3.

Each of the rear camera 40B, the left side camera 40L, and the right side camera 40R is attached in an upper portion of the rotating platform 3 so that an optical axis faces obliquely downward, and has an imaging range (angle of view) in a vertical direction including an area from a ground surface near the excavator 100 to a distant place of the excavator 100.

The rear camera 40B, the left side camera 40L, and the right side camera 40R may be attached to an upper surface of the rotating platform 3. The cameras 40B, 40L, and 40R may be attached so that a portion of the rotating platform 3 is imaged and the optical axis faces obliquely downward in a state where the cameras 40B, 40L, and 40R do not protrude from a side surface end portion of the rotating platform 3.

An object to be imaged and a portion of the rotating platform 3 are simultaneously acquired as images. Accordingly, captured images can be intuitively determined as the images acquired by using the cameras provided in the excavator 100. In addition, a sense of distance between the object to be imaged and the excavator 100 can be intuitively understood.

The operation/posture state sensor 42 is a sensor that detects an operation state or a posture state of the excavator 100, and outputs a detection result to the controller 30. The operation/posture state sensor 42 includes a boom angle sensor, an arm angle sensor, a bucket angle sensor, a triaxial inertial sensor (IMU: Inertial Measurement Unit), a turning angle sensor, and an acceleration sensor.

The sensors may be configured to include a cylinder stroke sensor of the boom and a sensor that acquires rotation information of a rotary encoder, or may be replaced by an acceleration (including a speed or a position) acquired by the IMU.

The arm angle sensor detects a pivot angle (hereinafter, referred to as an "arm angle") of the arm 5 with reference to the boom 4.

The bucket angle sensor detects a pivot angle (hereinafter, referred to as a "bucket angle") of the bucket 6 with reference to the arm 5.

The IMU is attached to each of the boom 4 and the arm 5, and detects the acceleration of the boom 4 and the arm 5 along predetermined three axes and an angular acceleration of the boom 4 and the arm 5 around the predetermined three axes.

The turning angle sensor detects a turning angle with reference to a predetermined angular direction of the rotating platform 3. However, the present invention is not limited thereto, and the turning angle may be detected, based on a GPS or the IMU sensor provided in the rotating platform 3.

The acceleration sensor is attached to a position away from a turning axis of the rotating platform 3, and detects the acceleration at the attached position of the rotating platform 3. In this manner, based on a detection result of the acceleration sensor, it is possible to determine whether the rotating platform 3 is turned or whether the lower traveling body 1 travels.

The in-vehicle camera 43 is provided near the cockpit of the cabin 10, and images an operation of the operator inside the cabin 10. The in-vehicle camera 43 is installed to images a face of the operator from a front side so that a line of sight (eye movement) of the operator can be detected from the acquired image.

The manipulation device 45 is provided near the cockpit of the cabin 10 for the operator to operate each operation element (the lower traveling body 1, the rotating platform 3, the boom 4, the arm 5, and the bucket 6). In other words, the manipulation device 45 operates each hydraulic actuator that drives each operation element. For example, the manipulation device 45 includes a lever, a pedal, and various buttons, and outputs an operation signal corresponding to operation contents thereof to the controller 30.

In addition, the manipulation device 45 also includes various setting units configured to operate the imaging device 40, the operation/posture state sensor 42, the in-vehicle camera 43, the display unit 50, the voice output unit 60, the external notification device 70, and the communication device 80, and outputs an operation command for each unit to the controller 30.

The display unit 50 is provided in the periphery of the cockpit inside the cabin 10, and displays various image information to be notified to the operator under the control of the controller 30. For example, the display unit 50 is a liquid crystal display or an organic electroluminescence (EL) display, and may be a touch panel type that also functions as at least a portion of the manipulation device 45.

The voice output unit 60 is provided in the periphery the cockpit inside the cabin 10, and outputs various voice information to be notified (informed) to the operator under the control of the controller 30. For example, the voice output unit 60 is a speaker or a buzzer.

The external notification device 70 notifies a worker in the periphery of the excavator 100 or a supervisor in a work site. For example, the external notification device 70 may include a light source (lighting device) turned on and off toward the worker in the periphery of the excavator 100. In addition, the external notification device 70 may include an external display unit that provides image information (character information or drawing information) for the worker in the periphery of the excavator 100. In addition, the external notification device 70 may include an external voice output unit such as a speaker or a buzzer that outputs voice information to the worker in the periphery of the excavator 100.

The communication device 80 transmit and receive various information to and from a remote external device or another excavator 100 through a predetermined communication network (for example, a mobile phone network whose end is a base station or the Internet network), based on predetermined wireless communication standards.

The controller 30 is a control device that performs driving control of the excavator 100 by controlling an operation of each unit of the excavator 100. The controller 30 is mounted on the cabin 10. A function of the controller 30 may be realized by any desired hardware, software, or a combination thereof, and the controller 30 is configured to mainly include a microcomputer including a CPU, a RAM, a ROM, and an I/O, for example.

In addition, as functional units that fulfill various functions, the controller 30 includes an object detection unit 301, an instability detection unit 302, a behavior detection unit 303, a behavior evaluation unit 304, and an information output unit 305. In addition, the controller 30 includes a storage unit 310 serving as a storage region defined in an internal memory such as an electrically erasable programmable read-only memory (EEPROM).

Based on the image captured by the imaging device 40, the object detection unit 301 detects a predetermined detection object within a predetermined region (for example, a range from excavator 100 to a predetermined distance) in the periphery of the excavator 100 to detect an entry of the detection object into the predetermined region. Specifically, the object detection unit 301 recognizes the detection object inside the captured image by applying various known image processing methods or a machine learning-based classifier, and identifies an actual position or a size of the recognized detection object. The detection object is an obstacle that exists in the periphery of the excavator 100 or may enter the predetermined region. The detection object includes a person such as the worker in the periphery of the excavator 100, another work machine, a vehicle that carries out work in the periphery of the excavator 100, or a construction material temporarily placed in the periphery of the excavator 100.

Figure 3:
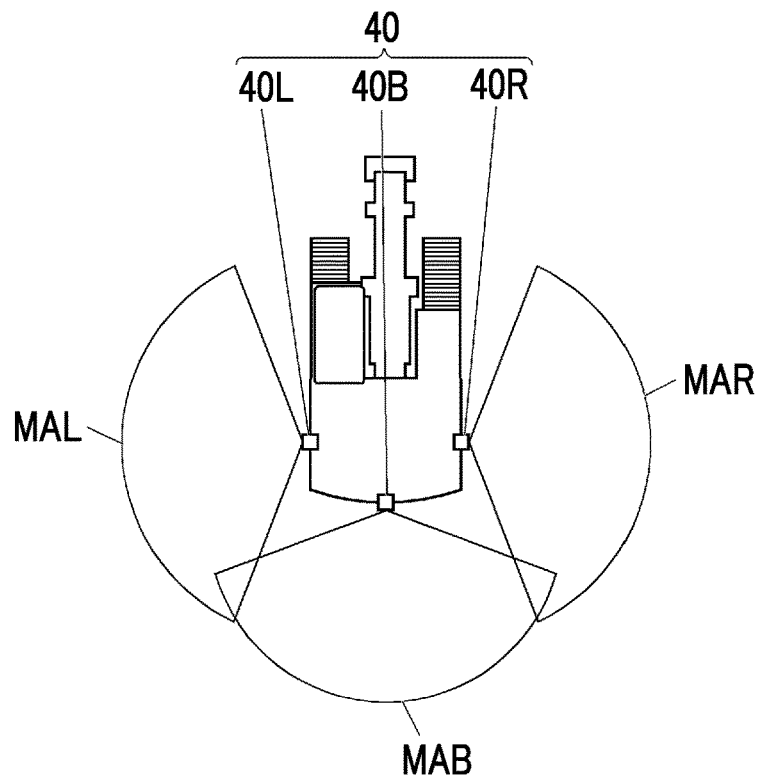
FIG. 3 is a view illustrating a detection range of an object detection unit.

FIG. 3 is a view illustrating an example of a detection range of the object detection unit 301.

As illustrated in the drawing, the object detection unit 301 has detection ranges MAB, MAL, and MAR respectively corresponding to the rear camera 40B, the left side camera 40L, and the right side camera 40R.

Here, the object detection unit 301 can change detection performance as follows. In response to a setting operation of the operator, a certain performance item relating to the detection performance of one detection unit is raised within a resource range of the controller 30. Alternatively, the detection performance of one detection unit or the other detection unit is lowered. The detection performance includes performance items such as a range in which a monitoring object can be detected (detection range), detection accuracy, and detection frequency for each detection cycle (that is, the number of times for detecting the monitoring object within a detection cycle).

In addition, when the object detection unit 301 detects a detection object inside a predetermined region in the periphery of the excavator 100, the object detection unit 301 causes the display unit 50 and/or the voice output unit 60 to outputs an image or a voice for notifying the operator of the detection result. An output mode in this case may be changed depending on a type of the detected detection object or a distance between the detection object and the excavator 100. In addition, after the notification output starts, the object detection unit 301 stops (cancels) the output, based on a predetermined condition (for example, a fact that the detection object cannot be detected inside the predetermined region).

As illustrated in FIG. 2, the instability detection unit 302 detects occurrence of a state where stability relating to an operation of the excavator 100 falls below a predetermined reference (hereinafter, referred to as "unstable state"). Specifically, the instability detection unit 302 acquires information relating to a state of the excavator 100 (operation state or control state) from various sensors (for example, the imaging device 40, the operation/posture state sensor 42, the in-vehicle camera 43, and the manipulation device 45) mounted on the excavator 100, various actuators (for example, an electromagnetic valve that performs hydraulic control), or various control devices (for example, other functional units of the controller 30). Then, based on the acquired information, the instability detection unit 302 detects the occurrence of an unstable state of the excavator 100 by determining whether or not the stability relating to the operation of the excavator 100 falls below the predetermined reference.

For example, the unstable state of the excavator 100 includes a state where there is a high possibility that the excavator 100 (lower traveling body 1) may slide forward or rearward due to a reaction force applied to the attachment from the ground during excavation work or leveling work (unstable slipping state).

In addition, for example, the unstable state of the excavator 100 includes a state where there is a high possibility that a front portion or a rear portion of the excavator 100 (lower traveling body 1) may float due to excavation reaction force (unstable floating state). In addition, for example, the unstable state of the excavator 100 includes a state where there is a high possibility that vibration may be generated in a vehicle body (the lower traveling body 1, the turning mechanism 2, and the rotating platform 3) due to a change in the moment of inertia of the attachment in an aerial operation (operation in a state where the bucket 6 is not grounded) of the attachment of the excavator 100 (unstable vibrating state).

In addition, when the instability detection unit 302 detects an unstable state of the excavator 100, the instability detection unit 302 causes the display unit 50 and/or the voice output unit 60 to output an image or a voice for notifying the operator of the detection result. The output mode in this case may be changed depending on a type or a degree of the detected unstable state. In addition, after the notification output starts, the instability detection unit 302 stops (cancels) the output, based on a predetermined condition (for example, a fact that the unstable state is eliminated).

The behavior detection unit 303 detects a behavior of the operator inside the cabin 10, based on the output of the in-vehicle camera 43 and the manipulation device 45.

The detected behavior of the operator includes a line of sight of the operator. The behavior detection unit 303 causes the in-vehicle camera 43 to image an eye movement of the operator. Based on image information, the behavior detection unit 303 detects the line of sight of the operator, for example, by using a positional relationship between a corneal reflex serving as a reference point and a pupil serving as a moving point, or between an inner corner of the eye serving as the reference point is and an iris serving as the moving point.

In addition, the detected behavior of the operator includes operation contents of the operator who operates the manipulation device 45. The behavior detection unit 303 detects the operation contents of the operator who operates the excavator 100, based on the output of the manipulation device 45.

The behavior evaluation unit 304 evaluates the behavior of the operator which is detected by the behavior detection unit 303 from a viewpoint of whether or not the behavior contributes to safety in the periphery of the excavator 100. Specifically, the behavior evaluation unit 304 calculates a safety behavior evaluation value obtained by quantitatively evaluating the behavior of the operator in terms of a degree of contribution to safety, and causes the storage unit 310 to store the safety behavior evaluation value as safety behavior evaluation information 3101. A calculation method for the safety behavior evaluation value will be described later in detail.

The information output unit 305 appropriately outputs the safety behavior evaluation information 3101 calculated as the safety behavior evaluation value by the behavior evaluation unit 304 and stored in the storage unit 310. For example, the information output unit 305 causes the display unit 50 to display the safety behavior evaluation information 3101.

An output mode in this case is not particularly limited, and for example, only the safety behavior evaluation value may be displayed on the display unit 50.

Figure 4:
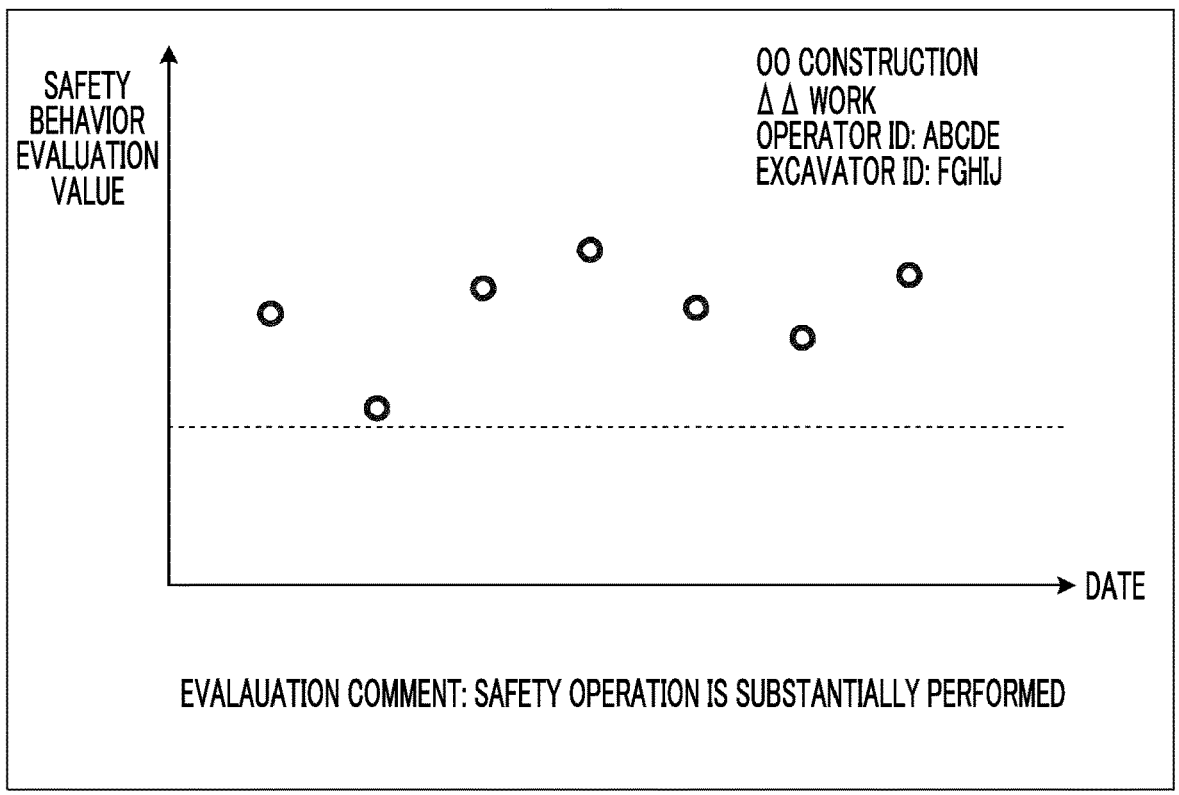
FIG. 4 is a view illustrating a display example of safety behavior evaluation information.

Alternatively, for example, as illustrated in FIG. 4, the information output unit 305 may collectively output a plurality of safety behavior evaluation information 3101 (safety behavior evaluation value) relating to the same operator, stored in the storage unit 310, by using a graph comparing changes in each predetermined time unit (in the example of FIG. 4, a day, a week, or a month may be used). In this case, it is preferable to divide the graph in accordance with a risk type when the operator behaves.

In addition, the information output unit 305 may output the safety behavior evaluation information 3101 in a visually recognizable manner, and may cause a printer (not illustrated) to output the safety behavior evaluation information 3101 to a paper medium, for example. In this case, the information may be output from a printer provided inside the cabin 10 of the excavator 100, or the information may be transmitted by the communication device 80 to a printer provided in a management center that manages the work so that the information is output from the printer.

In addition, when the information output unit 305 outputs the safety behavior evaluation information 3101, the information output unit 305 may output work-related information relating to the work together when the safety behavior evaluation information 3101 is acquired (refer to FIG. 4). The work-related information includes work information, date and time information, weather information, position information, machine body information, and operator information. The information output unit 305 appropriately acquires the work-related information, and stores the work-related information in the storage unit 310.

The work information can include information such as a work (construction) name, a work place, a work content, an owner of the excavator, a subcontractor of the work, an intermediate person, and an end user relating to the work. For example, the information output unit 305 acquires work information, based on an input operation of the operator through the manipulation device 45.

The date and time information includes the date, the day of the week, and the time of day. The information output unit 305 acquires the date and time information by using a timekeeper (for example, a real time clock (RTC)) inside the controller 30.

The weather information is weather information in a place at the date and time during the work of the excavator 100, and includes information relating to a weather classification such as sunny, cloudy, rainy, and snowy. The information output unit 305 acquires desired weather information from a server or website relating to the weather through the communication device 80. Alternatively, the information output unit 305 may include an illuminance sensor or a raindrop detection sensor, and may acquire the weather information, based on illuminance or the presence or absence of the raindrop which is output by the sensors.

The position information is information on a position of the excavator 100, and includes information relating to a longitude and a latitude. In addition, the position information may include more advanced information, or may be geocode information such as the Geohash. For example, the information output unit 305 may include global navigation satellite system (GNSS) device, and may acquire the position information of the excavator 100, based on a signal from a satellite in the sky above the excavator 100.

The machine body information is identification information of the excavator 100 for identifying the excavator 100, and is a prescribed machine number or an ID of the excavator, for example. For example, the information output unit 305 acquires the machine body information by reading the machine number recorded in advance in the storage unit 310.

The operator information is identification information of the operator for identifying the operator who operates the excavator 100, and is a prescribed operator ID. For example, the information output unit 305 acquires the operator information, based on an input operation of the operator through the manipulation device 45.

The work-related information (work information, date and time information, weather information, position information, machine body information, and operator information) is input by the input operation through the manipulation device 45 (information may directly be input or may be selected from information set in advance). However, the information may automatically be acquired by using a communication technology or an information processing technology. The work-related information may be stored in association with each other.

Operation of Excavator

Subsequently, an operation of the excavator 100 when a behavior evaluation process for evaluating the behavior of the operator is performed during occurrence of a risk will be described.

Figure 5:
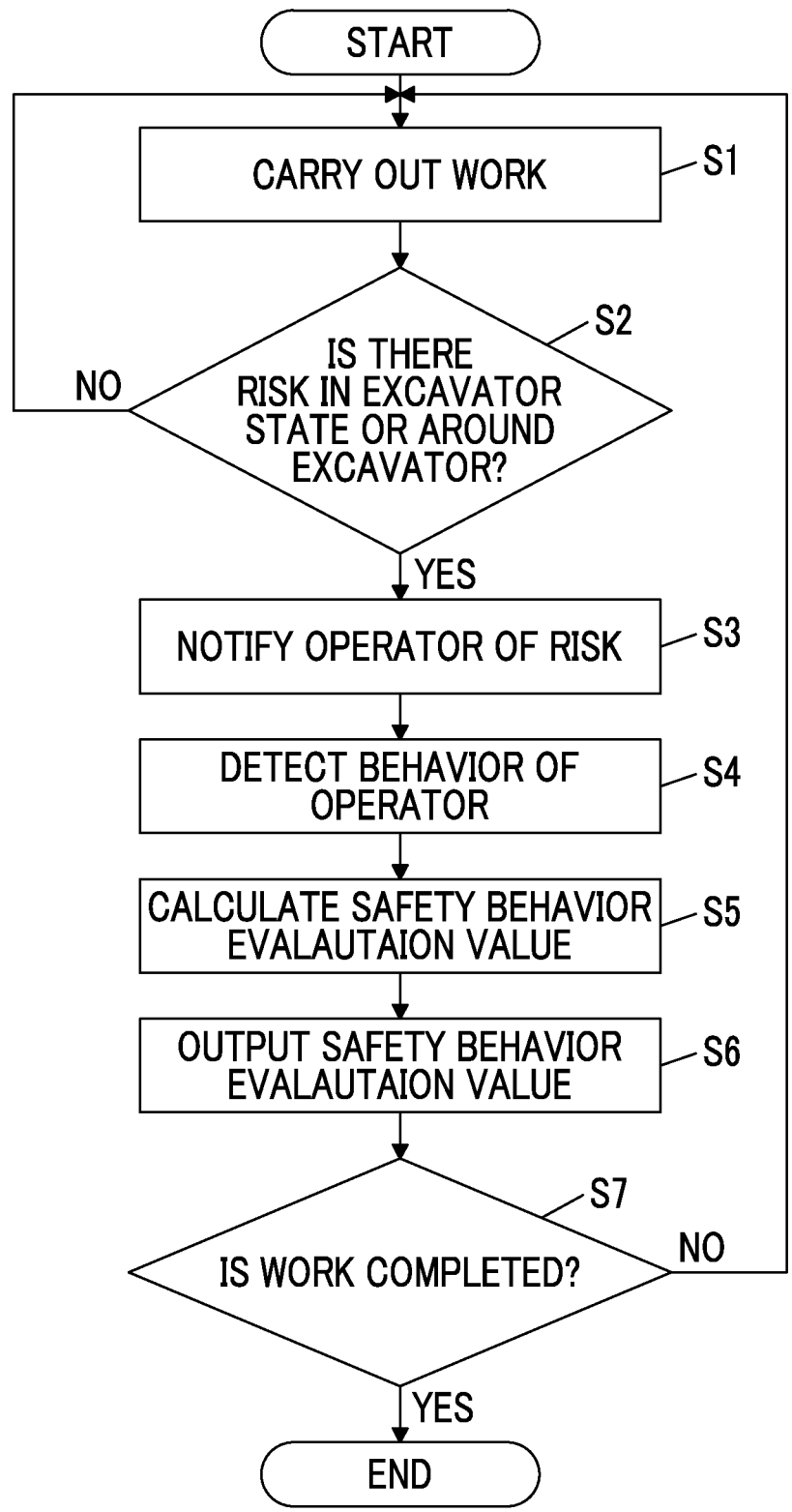
FIG. 5 is a flowchart illustrating a flow of a behavior evaluation process.

FIG. 5 is a flowchart illustrating a flow of the behavior evaluation process.

The behavior evaluation process is a process for evaluating safety of a work site and improving the safety of the work site by evaluating the behavior of the operator of the excavator 100 when the risk occurs, from a viewpoint of the safety, and outputting a result thereof so that work-related persons including the operator himself or herself can recognize the result. The behavior evaluation process is performed to cause the CPU to execute a program stored in an internal storage device by the controller 30.

When the behavior evaluation process is performed, as illustrated in FIG. 5, the controller 30 first drives the excavator 100 to start the work (Step S1). In this case, the display unit 50 inside the cabin 10 displays an image in the periphery of the excavator 100 which is captured by the imaging device 40.

Next, the controller 30 determines whether or not a risk relating to a state of the excavator 100 or a surrounding environment thereof is detected (Step S2). In the present embodiment, as the risk, an entry of an obstacle region (person, another work machine, or construction material) into a predetermined region in the periphery of the excavator 100, an unstable state (unstable slipping state, unstable floating state, or unstable vibrating state) of the excavator 100 are detected.

Specifically, the object detection unit 301 of the controller 30 detects the entry of the obstacle into a predetermined region in the periphery of the excavator 100, based on the image captured by the imaging device 40. The object detection unit 301 identifies a position or a size of the obstacle from the captured image.

In addition, the instability detection unit 302 of the controller 30 detects the unstable state of the excavator 100, based on a detection result of the operation/posture state sensor 42. When a predetermined unstable operation that may cause the unstable state of the excavator 100 is detected, the instability detection unit 302 may determine that the unstable state occurs.

Then, when it is determined that no risk is detected (Step S2; No), the process proceeds to Step S1 described above, and the controller 30 continues the work.

When it is determined in Step S2 that a risk relating to a state of the excavator 100 or the surrounding environment is detected (Step S2; Yes), the controller 30 notifies the operator of the detected risk (Step S3). Specifically, the controller 30 notifies the operator that the risk is detected, by outputting an alarm sound from the voice output unit 60 inside the cabin 10 or displaying alarm information on the display unit 50. A notification mode in this case may be changed depending on a type or a degree of the detected risk (for example, loudness of the alarm sound may be changed depending on a distance between the detected obstacle and the excavator 100).

Next, the controller 30 detects the behavior of the operator (Step S4).

Specifically, the behavior detection unit 303 of the controller 30 detects a line of sight of the operator, based on the image captured by the in-vehicle camera 43, and identifies a visual object of the operator. In addition, the behavior detection unit 303 detects operation contents of the excavator 100 operated by the operator, based on an output of the manipulation device 45.

Next, the controller 30 calculates the safety behavior evaluation value of the operator, based on the behavior of the operator which is detected in Step S4 (Step S5). As described above, the safety behavior evaluation value is a numerical value obtained by quantitatively evaluating the behavior taken by the operator during the occurrence of the risk in terms of a degree of contribution to safety in the periphery of the excavator 100. In the present embodiment, as the safety behavior evaluation value is greater, the degree of contribution to safety is higher.

In Step S5, the behavior evaluation unit 304 of the controller 30 calculates the safety behavior evaluation value, based on the content of the risk detected in Step S2 and the behavior of the operator which is detected in Step S4. Here, the content of the risk is a type of the risk (in the present embodiment, existence of the obstacle and the unstable state of the excavator 100), or a degree of the risk (for example, a type of the obstacle (person or thing), and a distance between the obstacle and the excavator 100).

Specifically, the behavior evaluation unit 304 calculates the safety behavior evaluation value by using a rule base. That is, the behavior evaluation unit 304 determines whether or not the behavior of the operator is coincident with a predetermined evaluation behavior set in advance, and when both are coincident with each other, the behavior evaluation unit 304 adds or deducts a point assigned to the coincident evaluation behavior. This process is performed for behaviors of all operators, and the safety behavior evaluation value is calculated as a total score in that case.

For example, the evaluation behavior to which the safety behavior evaluation value is added includes the following.

The image of the imaging device 40 is confirmed by visually recognizing the display unit 50.

The operation of the excavator 100 is carefully (gently) treated.

The operation of the excavator 100 is stopped.

The outside of the cabin 10 is visually confirmed.

The external notification device 70 is operated to notify the risk toward the periphery of the excavator 100.

When the obstacle is detected in the periphery, the vehicle body (lower traveling body 1, rotating platform 3, and attachment) is operated in a direction away from the obstacle. Alternatively, the work is continued without bringing the vehicle body close to the obstacle.

When the unstable state of the excavator 100 is detected, the excavator 100 is operated to eliminate the unstable state. For example, an excavation point and a main body of the excavator are brought relatively close to each other so that the center of gravity is less likely to be separated. In addition, a traveling speed or an operation speed is slowed down.

For example, the evaluation behavior from which the safety behavior evaluation value is deducted includes the following.

The excavation operation of the excavator 100 is continued as it is (no change is observed in the operation content).

The contents of the evaluation behavior may vary depending on the contents of the detected risk (type or degree thereof). In addition, even when the evaluation behaviors are the same as each other, different points may be set depending on the contents of the risk.

A point corresponding to a degree of contribution to safety is assigned to each of the evaluation behaviors. For example, a greater addition point may be assigned to the evaluation behavior for "stopping the operation of the excavator 100" than the evaluation behavior for "slowing down the operation of the excavator 100", in that contact between the excavator 100 and the obstacle can more reliably be avoided.

For example, the evaluation behavior may be set by using machine learning such as naive Bayes or a neural network.

The calculated safety behavior evaluation value is stored in the storage unit 310 as the safety behavior evaluation information 3101. In this case, the stored safety behavior evaluation value is stored in the storage unit 310 in association with the above-described work-related information relating to the work when the evaluation is made. The work-related information is acquired in advance or when needed by the information output unit 305, and is stored in the storage unit 310.

Thereafter, at least when the risk detected in Step S2 is eliminated and the excavator 100 returns to a normal state, the controller 30 outputs the safety behavior evaluation value calculated in Step S5 (Step S6).

In this step, the information output unit 305 of the controller 30 uses a graph collectively illustrating the safety behavior evaluation value calculated in the Step S5 and the past safety behavior evaluation value relating to the same operator (refer to FIG. 4), for example. In this manner, the graph is displayed on the display unit 50, or is output from a printer (not illustrated). For example, a result may be output in Step S6 after the work is completed.

Next, the controller 30 determines whether or not the work is completed by the excavator 100 (Step S7), and when the controller 30 determines that the work is not completed (Step S7; No), the process proceeds to Step S1 described above, and the controller 30 continues the work. In this manner, detection of the risk, notification thereof, detection of the behavior of the operator, and evaluation thereof are sequentially performed and repeated until it is determined that the work is completed.

In addition, when it is determined that the work is completed, for example, when a power source such as an engine of the excavator 100 is stopped by the operator, and at least in a state where an actuator of the attachment is not moved even when the actuator is operated (Step S7; Yes), the controller 30 completes the behavior evaluation process. When electric storage unit is provided, in a state where the actuator is not moved even when the actuator is operated, the above-described process can be performed by activating the imaging device 40 or the controller 30.

Technical Effects of Present Embodiment

As described above, according to the present embodiment, when the risk relating to a state of the excavator 100 or the surrounding environment is detected, the operator is notified of the risk, and the behavior of the operator after the notification is detected. Then, based on the contents of the detected risk and the behavior of the operator, the safety behavior evaluation value obtained by quantitatively evaluating the behavior of the operator in terms of a degree of contribution to safety is calculated.

In this manner, the behavior of the operator of the excavator 100 when the risk occurs can quantitatively be evaluated from a viewpoint of safety, and safety of the work site can be improved.

In addition, the calculated safety behavior evaluation value is output in a visually recognizable manner. Accordingly, the operator himself or herself or the work-related persons can recognize the safety behavior evaluation value, and can reflect the safety behavior evaluation value in improving safety of the work site.

In addition, the safety behavior evaluation value relating to the same operator is output as a graph comparing changes in each predetermined time unit (for example, a day). Accordingly, a change in the safety behavior of the operator can easily be recognized.

Modification Example

Subsequently, a modification example of the above-described embodiment will be described.

This modification example is different from the above-described embodiment in that the safety behavior evaluation information acquired by the plurality of excavators 100 is managed by a management server and can be read by using an information terminal. The same reference numerals will be assigned to component the same as those in the above-described embodiment, and description thereof will be omitted.

Figure 6:
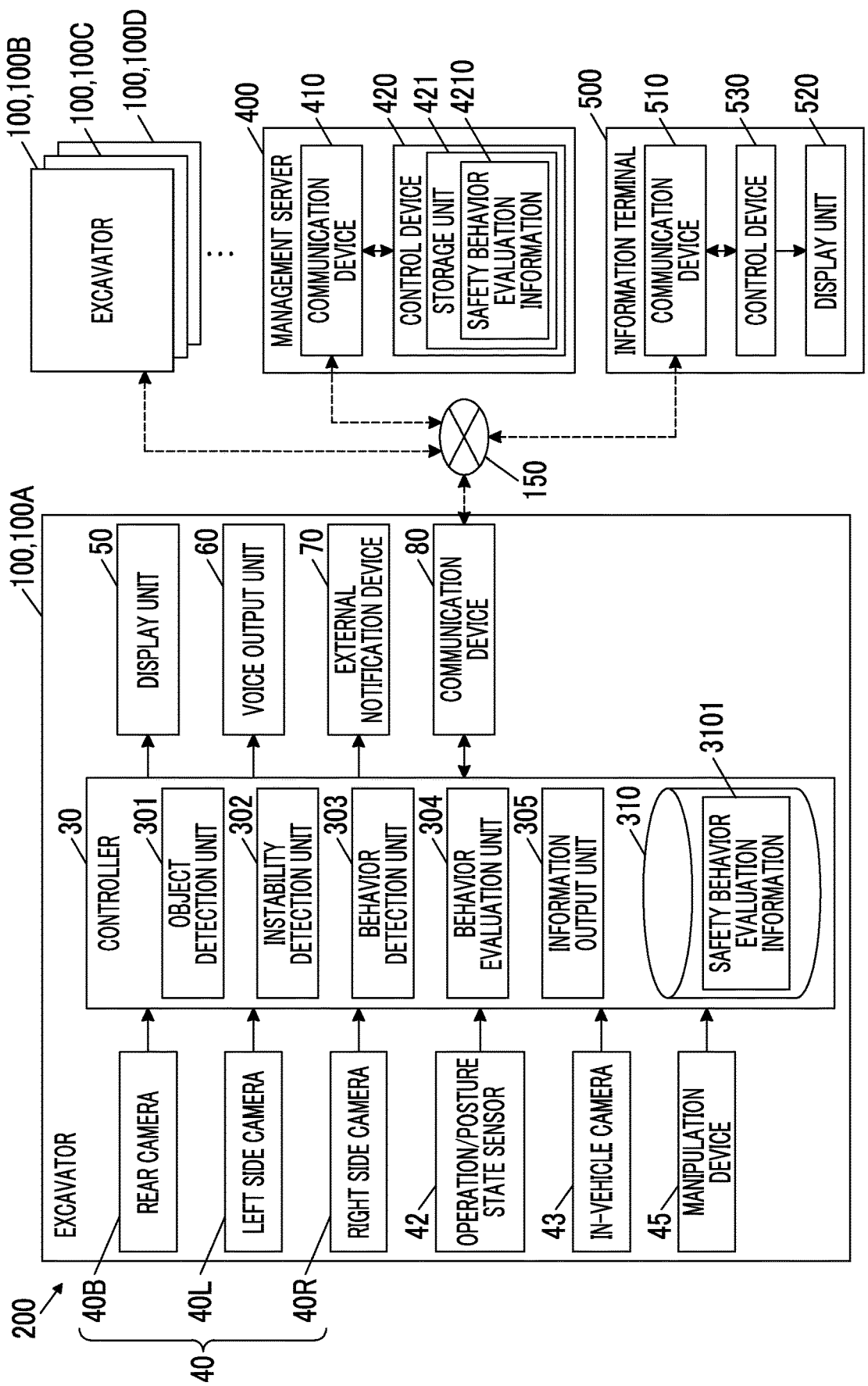
FIG. 6 is a block diagram illustrating a system configuration of an information management system according to a modification example of the embodiment of the present invention.

FIG. 6 is a block diagram illustrating a system configuration of an information management system 200 according to this modification example.

As illustrated in drawing, the information management system 200 is configured to include a plurality of excavators 100 (100A, 100B, 100C, and 100D in this modification example) configured to be similar to each other, a management server 400, and an information terminal 500. In FIG. 6, the configuration of the excavator 100 (100B, 100C, and 100D) other than the excavator 100A is omitted in the illustration.

The plurality of excavators 100 can transmit and receive various information to each other through the communication network 150 by each of the communication devices 80 provided therein, and can also transmit and receive various information to and from each of the management server 400 and the information terminal 500 through the communication network 150.

The management server 400 is an example of an information management device according to the embodiment of the present invention, and for example, is a server device installed in a management center provided outside a work site where the plurality of excavators 100 carry out work. The management server 400 may be an in-house server operated by a business person who operates the information management system 200 or a related business person thereof, or may be a so-called cloud server.

Specifically, the management server 400 includes a communication device 410 and a control device 420.

The communication device 410 can transmit and receive various information to and from each of the plurality of excavators 100 through the communication network 150.

The control device 420 controls various operations in the management server 400. The control device 420 includes a storage unit 421 serving as a storage region defined in an internal memory such as EEPROM, and stores and manages various information in the storage unit 421. For example, the safety behavior evaluation value (safety behavior evaluation information 3101) calculated by each of the excavators 100 is stored (accumulated) in the storage unit 421 as the safety behavior evaluation information 4210.

For example, the information terminal 500 is a mobile terminal such as a tablet or a smartphone possessed by a user. The user can access and read various work records inside the information management system 200 through the information terminal 500. The information terminal 500 may be a stationary computer terminal or a portable computer terminal.

Specifically, the information terminal 500 includes a communication device 510, a display unit 520, and a control device 530.

The communication device 510 can transmit and receive various information to and from each of the plurality of excavators 100 and the management server 400 through the communication network 150. For example, the display unit 520 is a liquid crystal display or an organic electroluminescence (EL) display, and may be a touch panel type that also serves as an operation unit. The control device 530 controls various operations in the information terminal 500.

In the information management system 200, while each of the plurality of excavators 100 is operated in substantially the same manner as in the above-described embodiment, the safety behavior evaluation value (safety behavior evaluation information 3101) acquired by each of the excavators 100 is transmitted to the management server 400. In this manner, all of the safety behavior evaluation values are stored in the management server 400 as the safety behavior evaluation information 4210.

The user who possesses the information terminal 500 can read the safety behavior evaluation information 4210 stored in the management server 400 through the communication network 150. In this case, the control device 530 of the information terminal 500 receives the desired safety behavior evaluation information 4210 from the management server 400 through the communication network 150, stores (or temporarily stores) the desired safety behavior evaluation information 4210 in a storage unit (not illustrated), for example, and causes the display unit 520 to display the desired safety behavior evaluation information 4210.

Figure 7:
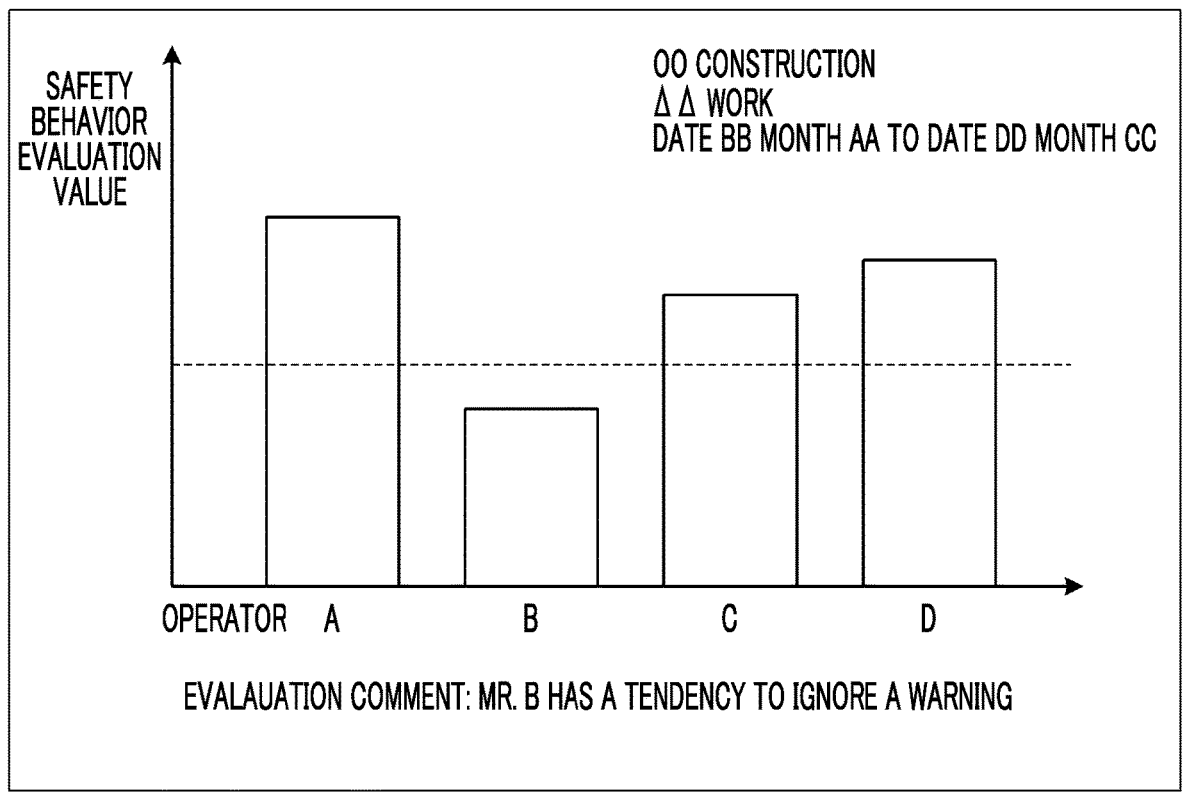
FIG. 7 is a view illustrating another display example of the safety behavior evaluation information.

A display mode in this case is not particularly limited, and for example, as in the above-described embodiment, the safety behavior evaluation may collectively be displayed in one graph for each operator. Alternatively, for example, as illustrated in FIG. 7, the safety behavior evaluation values relating to a plurality of operators belonging to a business person may collectively be displayed (output) in one graph for each business person participating in a construction so that the operators can be compared with each other. In this manner, the plurality of operators can relatively be evaluated from a viewpoint of safety.

A timing at which information is transmitted from each of the excavators 100 to the management server 400 is not particularly limited, and for example, the timing may be after a series of the works is completed.

In addition, the safety behavior evaluation value and the work-related information may be associated with each other by each of the excavators 100 for which the safety behavior evaluation value is calculated, or may be associated with each other by the management server 400. When being associated with each other by the management server 400, the work-related information may be transmitted from the excavator 100 to the management server 400. Alternatively, a configuration (partial function of the information output unit 305 in the excavator 100) which can acquire the work-related information may be provided in the management server 400.

In addition, the management server 400 may perform the display in the same manner as the information display (output) on the information terminal 500. In this case, the control device 420 of the management server 400 may output the information the same as that of the information terminal 500 described above from a display unit or a printer (not illustrated) provided in the management server 400.

In addition, the safety behavior evaluation value may be calculated by the management server 400. In this case, the management server 400 may store information required for calculation (evaluation behavior described above) in advance, may acquire information on the contents of the risk and the behavior of the operator from each of the excavators 100, and may calculate the safety behavior evaluation value. Others Hitherto, the embodiment of the present invention has been described. However, the present invention is not limited to the above-described embodiment.

For example, in the above-described embodiment, as the risk relating to the state or the surrounding environment of the excavator 100, the entry of the obstacle to the periphery of the excavator 100 and the unstable state of the excavator 100 are detected. However, for example, other risks such as inattentive driving of the operator may be included. In this case, when a configuration capable of detecting the risk is required, the configuration is provided in the excavator 100.

In addition, in the above-described embodiment, the obstacle in the periphery of the excavator 100 is detected, based on the captured image of the imaging device 40. However, instead of or in addition to the captured image of the imaging device 40, the obstacle in the periphery of the excavator 100 may be detected, based on a detection result (distance image) of other sensors, for example, such as a millimeter wave radar, light detection and ranging (LIDAR), and a stereo camera. In this case, these other sensors are provided in the excavator 100.

In addition, the work machine according to the embodiment of the present invention may be work machines other than the excavator, for example, such as a wheel loader, an asphalt finisher, a forklift, and a crane.

In addition, the information management system according to the embodiment of the present invention may include other work machines different therefrom.

In addition, details in the above-described embodiment can be appropriately changed within the scope not departing from the concept of the invention.

As described above, the work machine information processing device, the information management system, and the work machine information processing program according to the embodiment of the present invention are usefully adopted in improving safety of a work site.

It should be understood that the invention is not limited to the above-described embodiment, but may be modified into various forms on the basis of the spirit of the invention. Additionally, the modifications are included in the scope of the invention.

What is claimed is:

1. A work machine information processing device comprising:
   a risk detector configured to detect a risk relating to a state or a surrounding environment of a work machine;
   a notifier configured to notify an operator of the work machine of the risk detected by the risk detector;
   a behavior detector configured to detect a behavior of the operator after notifying of the notifier; and
   a calculator configured to calculate a safety behavior evaluation value obtained by quantitatively evaluating the behavior of the operator in terms of a degree of contribution to the safety, based on contents of the risk detected by the risk detector and the behavior of the operator detected by the behavior detector.

2. The work machine information processing device according to claim 1, further comprising:
   an output unit configured to output the safety behavior evaluation value calculated by the calculator in a visually recognizable manner.

3. The work machine information processing device according to claim 2,
   wherein the output unit outputs the safety behavior evaluation value relating to the same operator, as a graph for comparing changes in the safety behavior evaluation value in predetermined time units.

4. The work machine information processing device according to claim 1,
   wherein the calculator determines whether or not the behavior of the operator detected by the behavior detector is coincident with a predetermined evaluation behavior set in advance, and when both are coincident with each other, the calculator calculates the safety behavior evaluation value by adding or deducting a point assigned to the coincident evaluation behavior.

5. The work machine information processing device according to claim 1,
   wherein the risk detector includes:
      an object detector configured to detect an entry of an obstacle into a predetermined region in periphery of the work machine, and
      an instability detector configured to detect an unstable state of the work machine.

6. The work machine information processing device according to claim 1,
wherein the work machine information processing device is mounted on the work machine.

7. An information management system comprising:
a plurality of work machines on each of which is mounted with a work machine information processing device, the work machine information processing device comprising:
  a risk detector configured to detect a risk relating to a state or a surrounding environment of a work machine,
  a notifier configured to notify an operator of the work machine of the risk detected by the risk detector,
  a behavior detector configured to detect a behavior of the operator after notifying of the notifier, and
  a calculator configured to calculate a safety behavior evaluation value obtained by quantitatively evaluating the behavior of the operator in terms of a degree of contribution to the safety, based on contents of the risk detected by the risk detector and the behavior of the operator detected by the behavior detector; and
an information management device configured to transmit and receive information to and from the plurality of work machines,
wherein the information management device includes a storage unit configured to accumulate the safety behavior evaluation value received from the plurality of work machines.

8. The information management system according to claim 7, wherein the information management device includes an output unit configured to output the safety behavior evaluation value relating to a plurality of operators corresponding to the plurality of work machines, as a graph for comparing the safety behavior evaluation value for each operator.

9. A non-transitory computer readable medium storing a work machine information processing program that causes a computer of a work machine information processing device including risk detector to execute a process for detecting a risk relating to a state or a surrounding environment of a work machine, the process comprising:
  notifying an operator of the work machine of the risk detected by the risk detector;
  detecting a behavior of the operator after notifying of the risk; and
  calculating a safety behavior evaluation value obtained by quantitatively evaluating the behavior of the operator in terms of a degree of contribution to the safety, based on contents of the risk detected by the risk detector and the behavior of the operator detected by the behavior detector.

* * * * *